United States Patent [19]

Fong

[11] Patent Number: 4,960,269

[45] Date of Patent: Oct. 2, 1990

[54] MULTI-JAW VISE

[76] Inventor: Bright K. C. Fong, 2454 Cambridge Ave., Fullerton, Calif. 92635

[21] Appl. No.: 432,264

[22] Filed: Nov. 6, 1989

[51] Int. Cl.[5] .......... B23Q 3/00

[52] U.S. Cl. .......... 269/87.2; 269/224; 269/254 CS

[58] Field of Search .......... 269/87, 87.1, 87.2, 269/164, 224, 254 CS, 247, 295; 279/1 L

[56] References Cited

U.S. PATENT DOCUMENTS

| | | | |
|---|---|---|---|
| 791,438 | 5/1905 | Caldwell et al. | 269/87 |
| 1,900,314 | 3/1933 | Strom | 269/87 |
| 2,003,619 | 6/1935 | Williamson | 269/87 |
| 2,111,468 | 3/1938 | Corkum | 269/87.2 |
| 2,574,306 | 11/1951 | Walker | 269/87.2 |
| 2,613,714 | 10/1952 | Miller | 269/87.2 |
| 2,680,395 | 6/1954 | Christiansen | 269/164 |
| 2,779,364 | 1/1957 | Farmer | 269/224 |
| 4,821,393 | 4/1989 | Spigarelli | 269/224 |

FOREIGN PATENT DOCUMENTS

| | | | |
|---|---|---|---|
| 1321574 | 7/1987 | U.S.S.R. | 269/164 |

*Primary Examiner*—Robert C. Watson
*Attorney, Agent, or Firm*—Morland C. Fischer

[57] ABSTRACT

A multi-jaw vise structure comprising both fixed and movable jaws that are adapted to clamp a workpiece and a portion to be severed therefrom in such a manner that excessive tool wear and uneven cut surfaces resulting from vibration and/or the break-away of the severed portion are substantially eliminated. One of the jaws of the vise includes a movable bearing face which is biased by a compression spring into contact with the workpiece to cause at least some of the workpiece to remain clamped within the vise when the vise is partially opened while permitting the cut off portion to be freely removed.

11 Claims, 2 Drawing Sheets

MULTI-JAW VISE

BACKGROUND OF THE INVENTION

1. FIELD OF THE INVENTION

The present invention relates generally to a vise used to clamp materials to be cut and, more particularly, to a multi-jaw vise adapted to permit a cleaner cut and to reduce tool wear and possible splintered end surfaces resulting from said cutting.

2. BACKGROUND ART

The use of a vise to clamp a workpiece during cutting operations is well known in the arts of wood and metal working. However, in conventionally designed vises, the clamping jaws consist of solid, continuous surfaces which requires that the piece to be cut off extend laterally outward and away from the vise to permit the severed piece to fall freely away. In many cases, however, there are several shortcomings associated with the use of a conventional vise during a cutting operation. First, the unsecured end of the workpiece vibrates as the cutting action proceeds. Secondly the unsecured portion of the workpiece tends to sag and, particularly with non-ductile materials, such as wood or cast iron, may even break away from the clamped section before the cutting action is fully completed. The net result of these two undesirable effects is excessive tool wear and pieces with inferior cut or splintered surfaces.

SUMMARY OF THE INVENTION

In general terms, a multi-jaw vise is disclosed which comprises both fixed and movable jaws to clamp a workpiece therebetween. The vise also comprises at least one pair of slots. The slots are arranged opposite one another in the fixed and movable jaws so as to intersect the bearing faces of said jaws. The slots are of substantially equal and uniform width and aligned with one another in the same vertical plane.

In use, the workpiece is inserted into the vise so that the cutting line falls within the area defined by the slots. That is, the portion of the workpiece being severed is clamped on one side of the slots, while the remainder of the workpiece is clamped on the other side when the vise is closed. The slots are of sufficient width such that a saw or other cutting tool may be easily inserted therethrough to cut the workpiece. By clamping both parts of the workpiece, vibration and break-away or splintering of the severed piece are substantially eliminated and superior cut surfaces and improved tool life are provided.

The disclosed vise also comprises a movable bearing face which is biased by a compression spring into contact with the workpiece so that, as the vise is opened to release one portion of the workpiece, the biased face will continue to bear against and retain the remaining portion within the vise. Such a feature is advantageous when a series of pieces is to be successively severed from the workpiece, since the bias pressure exerted by the spring against the movable bearing face can be adjusted to allow the workpiece to be easily moved into position for the next cut while keeping the workpiece in the proper aspect for cutting. Such retention is also of value in an automated system where either the trimmed workpiece or the severed piece cut therefrom is to be removed for further processing by the system.

Other features and advantages of the present invention will become apparent from the following description when taken in connection with the accompanying drawings.

DESCRIPTION OF THE PREFERRED EMBODIMENT

Figure 1:
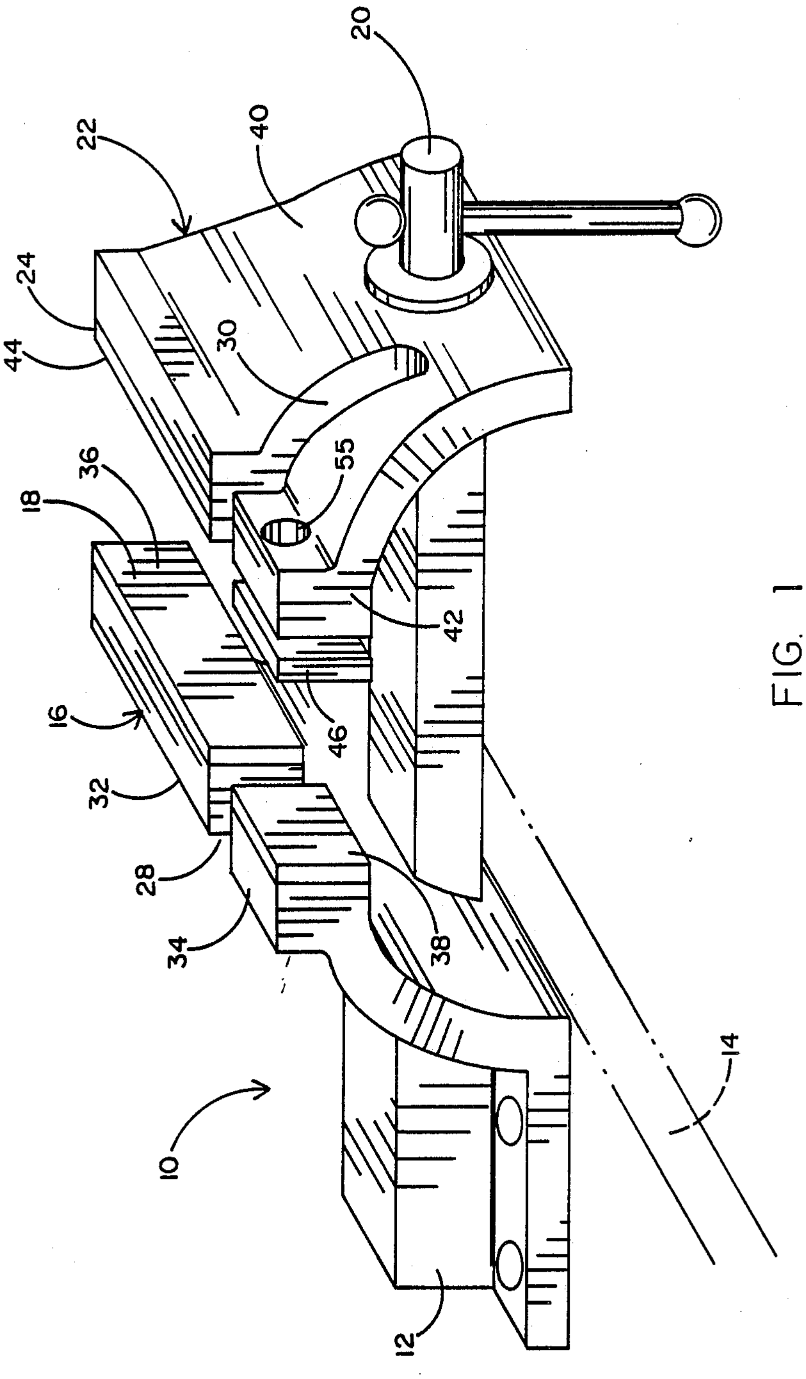
FIG. 1 is an isometric elevational view of the multi-jaw vise which forms the present invention.

Referring concurrently to FIGS. 1–4 of the drawings, there is shown a multi-jaw vise 10 including a frame 12 adapted to be mounted onto a workbench or machine tool 14. The vise 10 further includes a fixed jaw 16, having a bearing face 18, and a movable jaw 22 having a bearing face 24. A conventional closure device 20 is connected to the movable jaw 16 to control the distance between the fixed and movable jaws 16 and 22 and the clamping force generated thereby. The bearing faces 18 and 24 of jaws 16 and 22 lie in parallel planes, such that when the closure device 20 is operated to separate jaws 16 and 22, a gap is established therebetween to receive a workpiece. When movable jaw 22 is moved inwardly toward jaw 16, the gap closes, such that the opposing faces 18 and 24 of the jaws 16 and 22 bear upon and clamp the workpiece. Typically, closure device 20 is a screw which may either be manually or electrically rotated by, for example, a stepper or servo motor. However, the choice of mechanisms to control the gap between jaws 16 and 22 is not critical, and other operating systems such as pneumatic or hydraulic operated solenoids, lever actions and rack and pinion drives may also be used to accomplish the same purpose.

Each of the fixed and movable jaws 16 and 22 includes at least one slot 28 and 30 formed therein. The slots 28 and 30 intersect the respective bearing faces 18 and 24 of jaws 16 and 22 and have a substantially equal and uniform width. The slots 28 and 30 are positioned opposite one another and lie in the same vertical plane which traverses jaws 16 and 22 in perpendicular alignment therewith. In this configuration, fixed jaw 16 is divided into two separate jaw sections 32 and 34 having respective bearing faces 36 and 38. Movable jaw 22 is also divided into two separate jaw sections 40 and 42 having respective bearing faces 44 and 46. Thus, a saw or other cutting tool may be passed through the slots 28 and 30 to cut a portion of the workpiece.

Although the plane of the slots 28 and 30 is illustrated as being perpendicular to that of the jaw faces, it is to be understood that this plane can also assume an angular orientation relative to said faces so that beveled or diagonal cuts may also be made in the workpiece. Moreover, although FIG. 1 shows only a single pair of opposing slots 28 and 30 incorporated into vise 10, it is to be understood that additional pairs of slots may also be formed through jaws 16 and 22, depending upon the intended application.

In use, a workpiece 26 is positioned within the vise 10 so that one portion thereof is at one side of the slots 28 and 30, and the portion to be severed therefrom is at the opposite side, such that the cutting line lies in the vertical plane of said slots. As a result, both the workpiece and the severable portion will be firmly clamped when the vise 10 is closed and the workpiece is cut by a cutting tool. For the cutting tool to enter the slots 28 and 30 and pass therethrough without difficulty, a slot width ranging from about ⅛ to about ½ inch is generally sufficient, although smaller or larger slot widths, depending upon the size and type of cutting tool, may be used. While the slots 28 and 30 may be placed at any location along the length of jaws 16 and 22, said slots are preferably positioned out of alignment with the closure device 20. This permits both the length of the slots and the depth of the cut to be maximized, thereby allowing larger workpiece sections to be easily and safely accommodated. With the workpiece clamped in the vise 10 as herein described, the problems of excessive tool wear and inferior or splintered end surfaces resulting from the vibration and workpiece break-away are substantially, if not entirely, eliminated.

Figure 2:
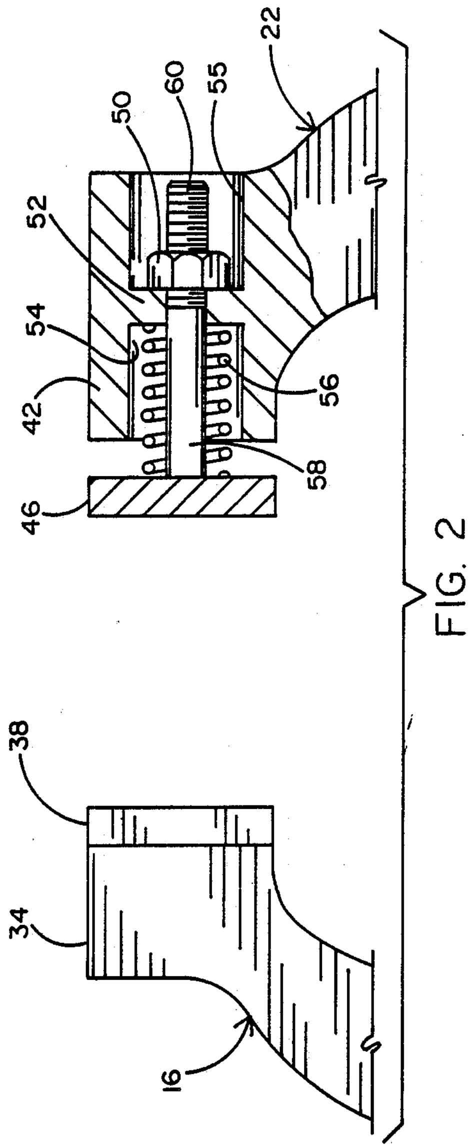
FIG. 2 is a partially cut away side view of the vise of FIG. 1 with the jaws in the fully open position.
Figure 4:
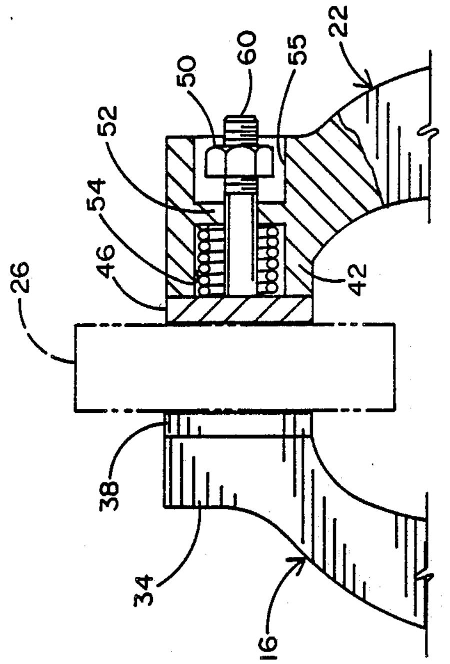
FIG. 4 is a partially cut away side view of the vise in the fully closed position.
Figure 3:
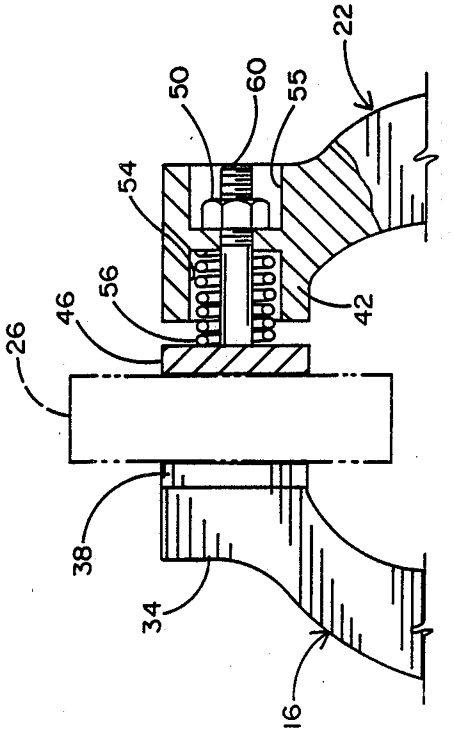
FIG. 3 is a partially cut away side view showing a clamped workpiece with the vise partially closed.

As shown generally in FIG. 1 and in more detail in FIGS. 2–4 of the drawings, the bearing face 46 is biased to move into the gap between the jaws 16 and 22 towards opposite bearing face 38. The movable bearing face 46 is biased by an adjustable biasing means which is preferably a compression/coil spring 56. However, the bearing face 46 may also be biased by pneumatic and hydraulic solenoids or resilient means having a spring-like memory, such as an elastomeric material, and the like. Coil spring 56 is located within an inner cavity 54 of the jaw section 42 of jaw 22 to surround a shaft 58. One end of the shaft 58 extends through cavity 54 and is fixedly connected to the movable bearing face 46, while the opposite end 60 of shaft 58 extends into an outer cavity 55 of jaw section 42 by way of an opening in a flange 52 which separates inner and outer cavities 54 and 55. One end of coil spring 56 bears against the movable bearing face 46, and the opposite end thereof bears against the flange 52. Therefore, the bias pressure applied from spring 56 to movable bearing face 46 can be adjusted by rotating nut 50 around the threaded end 60 of shaft 58 to vary the effective length of shaft 58 within inner cavity 58 and correspondingly control the state of compression of spring 58 between face 46 and flange 52.

With the vise 10 in the fully open position (best shown in FIG. 2), the movable bearing face 46 is moved away from jaw section 42 and towards the bearing face 38 of jaw section 34 until the nut 50 , which is rotated around shaft 58, is moved against the flange 52 at the interior of outer cavity 55. A displacement of the movable jaw 22 towards the fixed jaw 16 to close vise 10 will cause the outwardly extending bearing face 46 to engage and thereby clamp a portion of the workpiece 26 between jaws 16 and 22 (best shown in FIG. 3). However, the remainder of the workpiece is not yet clamped by vise 10.

As movable jaw 22 continues to move towards fixed jaw 16, the spring 56 is compressed against its normal bias, and the movable bearing face 46 is pushed rearwardly towards the jaw section 42 of movable jaw 22, whereby the entire workpiece 26 will now be clamped by vise 10 between the faces 36, 38 and 44, 46 thereof (best shown in FIG. 4). Accordingly, the workpiece is held securely between jaws 16 and 22 so as to be cut into two or more desired lengths.

By opening vise 10 and moving the movable jaw 22 away from the fixed jaw 16, the compression spring 56 will, under its normal bias, expand within cavity 54, whereby to maintain the movable bearing face 46 in contact with a length of the previously cut workpiece and thereby retain said length clamped between the bearing faces 38 and 46 of jaw sections 34 and 42. However, the remainder of the previously cut workpiece will be released and freely removable from between the bearing faces 36 and 44 of jaw sections 32 and 40 (of FIG. 1). The ability of vise 10 to concurrently retain and release different lengths of the previously cut workpiece is particularly advantageous when it is desirable to successively cut multiple lengths from the workpiece, since the bias pressure applied to the workpiece from bearing face 46 and spring 56 can be selectively adjusted to retain the workpiece, yet permit said workpiece to be moved laterally through the vise to the next cutting position.

It will be apparent that while a preferred embodiment of the invention has been shown and described, various modifications and changes may be made without departing from the true spirit and scope of the invention. For example, the bearing faces 36, 38, 44 and 46 need not be flat, but may be contoured to better accommodate non-rectangular workpieces such as pipe, wooden dowels, T-bars and similarly shaped materials. Moreover, where more than one pair of slots is used, a second or even a third face can be fitted with adjustable bias means as hereinabove described. When this is done, the individual bias pressures can be set to different values so that when a plurality of cuts is made before the vise is opened, the severed pieces may be removed one by one rather than all at once. Lastly, the bias pressure can be set so that where the workpiece and severed length are of different thicknesses or diameters, both pieces thereof can be effectively clamped for subsequent cutting.

Having thus set forth a preferred embodiment of the invention, what is claimed is:

1. A multi-jaw vise for clamping a workpiece and comprising:

fixed jaw means having first and second bearing faces that are spaced from one another by a slot that intersects said fixed jaw means;

movable jaw means having first and second bearing faces that are spaced from one another by a slot that intersects said movable jaw means, the first and second bearing faces of said movable jaw means positioned opposite and in substantially parallel alignment with the first and second bearing faces of said fixed jaw means, such that the slots intersecting said fixed and movable jaw means are aligned with one another in a common cutting plane for receiving a cutting tool therethrough to sever a workpiece being clamped;

closure means cooperating with said movable jaw means to cause the first and second bearing faces thereof to be moved simultaneously with one another away from the first and second bearing faces of the fixed jaw means to open said vice and permit the insertion of a workpiece and to cause the first and second bearing faces of said movable jaw means to be moved simultaneously with one another towards the first and second bearing faces of said fixed jaw means to close said vise and clamp the workpiece; and means cooperating with one of the bearing faces of said fixed or movable jaw means to enable said bearing face to move relative to its respective jaw means into contact with the workpiece being clamped so that when said vise is partially opened, the portion severed from the workpiece is released from said vise and the remaining portion of the workpiece remains clamped in said vice between said movable bearing face and its opposing bearing face.

2. The multi-jaw vise recited in claim 1, wherein said slots which intersect said fixed and movable jaw means extend completely through each of said jaw means to permit a cutting tool to pass uninterruptedly between the first and second bearing faces of each of said jaw means.

3. The multi-jaw vise recited in claim 1, wherein the means to enable said one bearing face to move relative to its respective jaw means comprises resilient means having a spring-like memory and bearing against said movable bearing face for biasing said bearing face for movement away from its jaw means.

4. The multi-jaw vise recited in claim 3, wherein the jaw means having said movable bearing face includes a cavity formed therein, one end of said resilient means received within said cavity and the opposite end thereof bearing against said movable bearing face to bias said bearing face for movement away from its jaw means.

5. The multi-jaw vise recited in claim 3, wherein said movable bearing face is interconnected with its jaw means by way of a shaft, said movable bearing face connected to said shaft and said shaft being slidable through said jaw means for displacing said movable bearing face relative to said jaw means.

6. The multi-jaw vise recited in claim 5, wherein said resilient means is a coil spring that surrounds said shaft between said movable bearing face and its jaw means for biasing said movable bearing face for movement away from said jaw means and said shaft for sliding through said jaw means.

7. The multi-jaw vise recited in claim 5, further comprising releasable locking means interconnected with said shaft to control the sliding of said shaft and the distance travelled by said movable bearing face relative to its jaw means.

8. The multi-jaw vise recited in claim 7, wherein said locking means is a fastener that is connected to said shaft and advanceable therealong so as to bear against the jaw means of said movable bearing face and thereby control the sliding of said shaft through said jaw means and the movement of said bearing face relative to said jaw means.

9. The multi-jaw vise recited in claim 8, wherein the jaw means having said movable bearing face has a cavity formed therein, said shaft being slidable through said cavity and said fastener connected to said shaft and bearing against said jaw means at a location within said cavity.

10. The multi-jaw vise recited in claim 1, wherein said movable bearing face is interconnected with and movable relative to said movable jaw means.

11. A multi-jaw vise for clamping a workpiece and comprising:

first and second pairs of jaws supported on a common stationary base, such that said first pair of jaws is spaced laterally and separated from said second pair of jaws to receive a cutting tool therebetween by which to sever a workpiece being clamped between said pairs of jaws;

each of said first and second pairs of jaws including a fixed jaw and a jaw which is aligned opposite and movable relative to said fixed jaw;

each of said fixed and movable jaws of said first and second pairs of jaws having a respective bearing face to engage the workpiece being clamped;

closure means cooperating with the movable jaws of said first and second pairs of jaws to cause said movable jaws to be moved away from the opposing fixed jaws of said first and second pairs of jaws to open said vise and permit the insertion of the workpiece and to cause said movable jaws to be moved towards the opposing fixed jaws to close said vise and clamp the workpiece at two locations therealong; and means interacting with the bearing face of the movable jaw from one of said first or second pairs of jaws to enable said bearing face to move relative to its jaw into contact with the workpiece being clamped, so that when said vise is partially opened, the portion severed from the workpiece is released from said vise and the remaining portion of the workpiece remains clamped in said vise between said movable bearing face and bearing face of the opposing fixed jaw.

* * * * *